(12) United States Patent
Otake et al.

(10) Patent No.: US 10,216,460 B2
(45) Date of Patent: Feb. 26, 2019

(54) COMMUNICATIONS SYSTEM, IMAGE PROCESSING APPARATUS, AND RECORDING MEDIUM FOR NOTIFYING TIMEOUT TIME

(71) Applicant: Konica Minolta, Inc., Tokyo (JP)

(72) Inventors: Toshihiko Otake, Ikeda (JP); Kazuya Anezaki, Itami (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/881,116

(22) Filed: Jan. 26, 2018

(65) Prior Publication Data
US 2018/0217787 A1 Aug. 2, 2018

(30) Foreign Application Priority Data
Jan. 27, 2017 (JP) .................................. 2017-012898

(51) Int. Cl.
*G06F 15/00* (2006.01)
*G06F 3/12* (2006.01)
*G06K 1/00* (2006.01)

(52) U.S. Cl.
CPC .......... *G06F 3/1204* (2013.01); *G06F 3/1207* (2013.01); *G06F 3/1236* (2013.01); *G06F 3/1291* (2013.01)

(58) Field of Classification Search
CPC .... G06F 3/1204; G06F 3/1207; G06F 3/1236; G06F 3/1291
USPC ............................... 358/1.15, 1.1, 1.13, 1.14
See application file for complete search history.

(56) References Cited

U.S. PATENT DOCUMENTS

| 9,729,656 B2* | 8/2017 | Yamagishi | .......... H04L 67/2823 |
| 2017/0251079 A1* | 8/2017 | Duckett | .................. H04L 67/34 |

FOREIGN PATENT DOCUMENTS

JP 2003-298608 A 10/2003

\* cited by examiner

*Primary Examiner* — Douglas Q Tran
(74) *Attorney, Agent, or Firm* — Osha Liang LLP

(57) ABSTRACT

In a communication system, within a first subnetwork, a first image processing apparatus sets a first timeout time serving as a timeout time for communication within the first subnetwork and a second timeout time serving as a timeout time for communication between the first subnetwork and the second subnetwork, and notifies an image processing apparatus within the first subnetwork other than the first image processing apparatus of the first timeout time and the second timeout time and notifies a second image processing apparatus of the second timeout time.

21 Claims, 15 Drawing Sheets

FIG.6

TIMEOUT TIME TABLE

|  | SET CONTENT |
|---|---|
| INTERNAL TIMEOUT TIME (WITHIN 1ST SUBNETWORK) | 20 [s] |
| EXTERNAL TIMEOUT TIME (DEVICE WITHIN 2ND SUBNETWORK) | 120 [s] |
| EXTERNAL TIMEOUT TIME (DEVICE WITHIN 3RD SUBNETWORK) | 150 [s] |

FIG.7

| FROM \ TO | 1ST SUBNETWORK | 2ND SUBNETWORK | 3RD SUBNETWORK |
|---|---|---|---|
| 1ST SUBNETWORK | THRESHOLD VALUE 1-1<br>20 [s] | THRESHOLD VALUE 1-2<br>120 [s] | THRESHOLD VALUE 1-3<br>150 [s] |
| 2ND SUBNETWORK | THRESHOLD VALUE 2-1<br>(= THRESHOLD VALUE 1-2)<br>120 [s] | THRESHOLD VALUE 2-2<br>30 [s] | THRESHOLD VALUE 2-3<br>160 [s] |
| 3RD SUBNETWORK | THRESHOLD VALUE 3-1<br>(= THRESHOLD VALUE 1-3)<br>150 [s] | THRESHOLD VALUE 3-2<br>(= THRESHOLD VALUE 2-3)<br>160 [s] | THRESHOLD VALUE 3-3<br>40 [s] |

FIG.9

TIMEOUT TIME TABLE

|  | SET CONTENT |
|---|---|
| INTERNAL TIMEOUT TIME (WITHIN 1ST SUBNETWORK) | 20 [s] |
| EXTERNAL TIMEOUT TIME (DEVICE WITHIN 2ND SUBNETWORK) | — |
| EXTERNAL TIMEOUT TIME (DEVICE WITHIN 3RD SUBNETWORK) | — |

FIG.10

TIMEOUT TIME TABLE

|  | SET CONTENT |
|---|---|
| INTERNAL TIMEOUT TIME (WITHIN 1ST SUBNETWORK) | 20 [s] |
| EXTERNAL TIMEOUT TIME (DEVICE WITHIN 2ND SUBNETWORK) | — |
| EXTERNAL TIMEOUT TIME (DEVICE WITHIN 3RD SUBNETWORK) | 150 [s] |

FIG.11

RESPONSE TIME OF INTERNAL NETWORK (IN MILLISECONDS)

| DATE \ TIME ZONE | 0:00 -1:59 | 2:00 -3:59 | 4:00 -5:59 | 6:00 -7:59 | 8:00 -9:59 | 10:00 -11:59 | 12:00 -13:59 | 14:00 -15:59 | 16:00 -17:59 | 18:00 -19:59 | 20:00 -21:59 | 22:00 -23:59 |
|---|---|---|---|---|---|---|---|---|---|---|---|---|
| : | : | : | : | : | : | : | : | : | : | : | : | : |
| 2017.1.4 (WEDNESDAY) | 120 | 120 | 110 | 80 | 50 | 55 | 70 | 55 | 60 | 65 | 90 | 115 |
| 2017.1.5 (THURSDAY) | 120 | 120 | 115 | 100 | 90 | 80 | 80 | 75 | 65 | 70 | 100 | 120 |
| : | : | : | : | : | : | : | : | : | : | : | : | : |

FIG.12

CORRESPONDENCE BETWEEN RESPONSE TIME & TIMEOUT TIME

| RESPONSE TIME: TR(MILLISECONDS) | TIMEOUT TIME(SECONDS) |
|---|---|
| TR ≤ 60 | 20 |
| 60 < TR ≤ 80 | 30 |
| 80 < TR ≤ 100 | 40 |
| 100 < TR ≤ 110 | 60 |
| 110 < TR ≤ 120 | 80 |
| 120 < TR ≤ 130 | 100 |
| 130 < TR ≤ 140 | 120 |
| 140 < TR ≤ 150 | 140 |
| 150 < TR | 160 |

COMMUNICATIONS SYSTEM, IMAGE PROCESSING APPARATUS, AND RECORDING MEDIUM FOR NOTIFYING TIMEOUT TIME

CROSS-REFERENCE TO RELATED APPLICATIONS

The entire disclosure of Japanese Patent Application No. 2017-012898, filed on Jan. 27, 2017, is incorporated herein by reference in its entirety.

BACKGROUND

Technical Field

The present disclosure relates to setting a timeout time in a communication system, and more particularly, to setting a timeout time in each of image processing apparatuses constituting a communication system including a plurality of subnetworks.

Description of the Related Art

Conventionally, various studies have been made on setting a timeout time of each of a plurality of information processors constituting a network. For example, Japanese Laid-Open Patent Publication No. 2003-298608 discloses a method of setting a timeout time in conjunction with communication within each of subnetworks constituting a network. This method sets a common timeout time for each communication type in each information processor constituting the subnetwork.

In the above method, each information processor communicates via a master node (a bridge device) with a device outside the subnetwork to which the information processor belongs. For communication beyond the subnetwork, the master node sets a timeout time.

In a network, a subnetwork may be arranged without interposing a bridge device as disclosed in Japanese Laid-Open Patent Publication No. 2003-298608. In such a case, it is expected that a timeout time for communication between subnetworks is not changed unless a network administrator or the like changes it. It is preferable that a timeout time is changed depending on the networks environment (for example, a communication speed), as appropriate. It is cumbersome for a user (for example, a network administrator) to be forced to perform an operation to change a timeout time depending on the networks environment.

As such, there is a demand for a technique for setting a timeout time for communication between subnetworks of a network without forcing a user to perform a cumbersome operation.

SUMMARY

According to one or more embodiments of the present invention, a communication system comprises a first subnetwork and a second subnetwork. The first subnetwork includes a first image processing apparatus. The second subnetwork includes a second image processing apparatus. The first image processing apparatus comprises a processor and a communication interface configured to communicate with another device. The processor is configured to set a first timeout time serving as a timeout time for communication within the first subnetwork and a second timeout time serving as a timeout time for communication between the first subnetwork and the second subnetwork, and via the communication interface notify an image processing apparatus within the first subnetwork other than the first image processing apparatus of the first timeout time and the second timeout time and via the communication interface notify the second image processing apparatus of the second timeout time.

According to one or more embodiments of the present invention, an image processing apparatus composing a communication system is provided. The communication system includes a first subnetwork and a second subnetwork. The image processing apparatus composes the first subnetwork. The image processing apparatus comprises a processor and a communication interface configured to communicate with another device. The processor is configured to set a first timeout time serving as a timeout time for communication within the first subnetwork and a second timeout time serving as a timeout time for communication between the first subnetwork and the second subnetwork, and via the communication interface notify an image processing apparatus within the first subnetwork other than the image processing apparatus having the processor mounted therein of the first timeout time and the second timeout time and via the communication interface notify an image processing apparatus composing the second subnetwork of the second timeout time.

According to one or more embodiments of the present invention, a non-transitory computer-readable storage medium storing a computer program executed by at least one processor of an image processing apparatus is provided. The image processing apparatus composes a communication system. The communication system includes a first subnetwork and a second subnetwork. The image processing apparatus composes the first subnetwork. The computer program causes the processor to perform: setting a first timeout time serving as a timeout time for communication within the first subnetwork and a second timeout time serving as a timeout time for communication between the first subnetwork and the second subnetwork, and notifying an image processing apparatus within the first subnetwork other than the image processing apparatus having the processor mounted therein of the first timeout time and the second timeout time and notifying an image processing apparatus composing the second subnetwork of the second timeout time.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 6 shows set contents of a timeout time (a timeout time table) according to one or more embodiments of the present invention.

FIG. 7 schematically shows set contents of a timeout time within a communication system according to one or more embodiments of the present invention.

FIG. 9 shows an exemplary state of a timeout time table according to one or more embodiments of the present invention.

FIG. 10 shows another exemplary state of a timeout time table according to one or more embodiments of the present invention.

FIG. 11 schematically shows a history of a response time serving as a communication speed according to one or more embodiments of the present invention.

FIG. 12 schematically shows a correspondence between response time and timeout time according to one or more embodiments of the present invention.

DETAILED DESCRIPTION OF EMBODIMENTS

Hereinafter, embodiments of the present invention will be described with reference to the drawings. However, the scope of the invention is not limited to the disclosed embodiments. In the following description, identical parts and components are identically denoted. Their names and functions are also identical. Accordingly, they will not be described redundantly.

[Schematic Configuration of Communication System]

Figure 1:
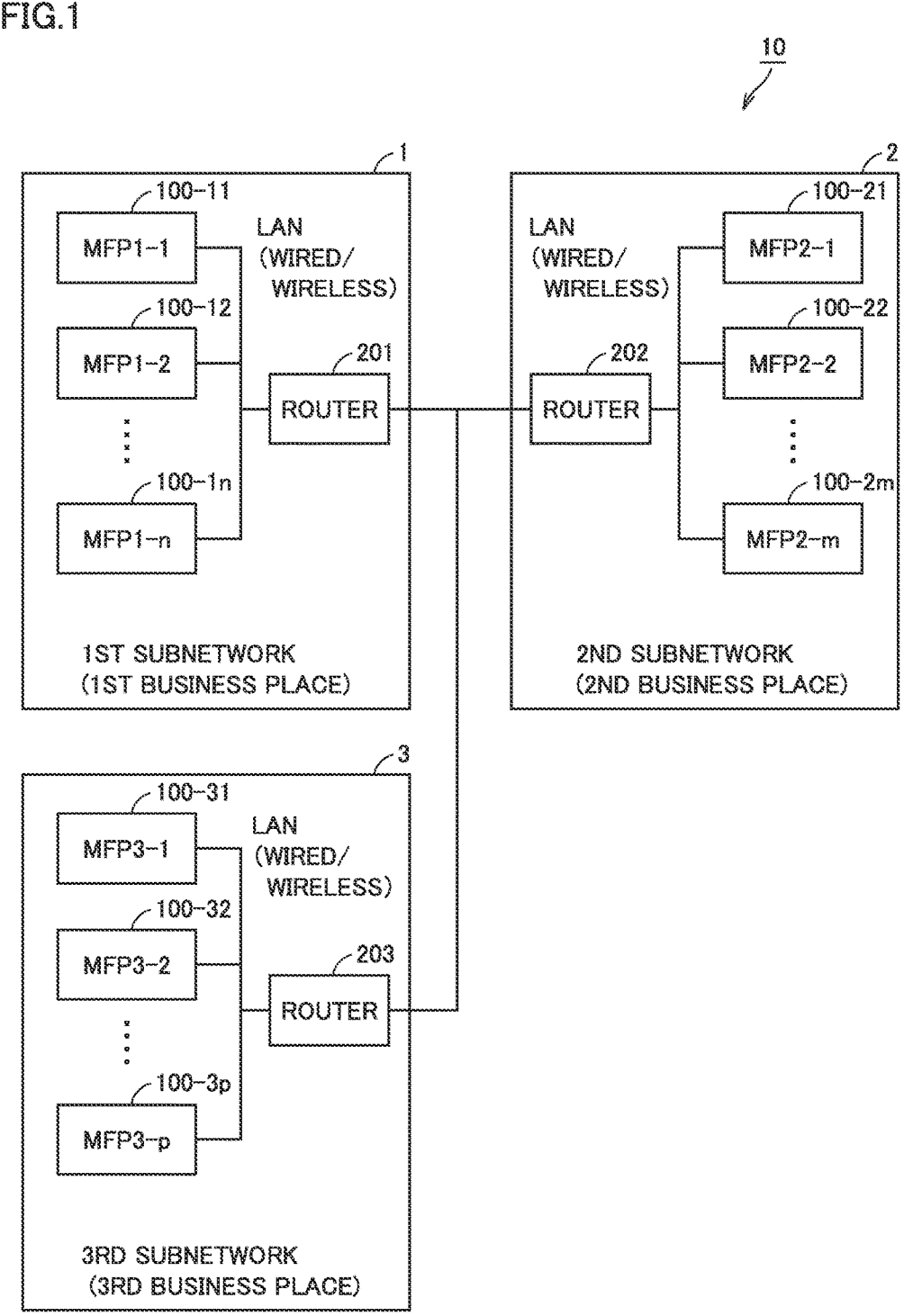
FIG. 1 schematically shows a configuration of a communication system according to one or more embodiments of the present invention.

FIG. 1 schematically shows a configuration of a communication system according to one or more embodiments of the present invention. As shown in FIG. 1, communication system 10 includes three subnetworks (i.e., first, second, and third subnetworks 1, 2, and 3). Each subnetwork is implemented for example by a LAN (a Local Area Network) and includes a plurality of MFPs (Multi-Functional Peripherals). The MFP is an example of an image processing apparatus. First subnetwork 1, second subnetwork 2, and third subnetwork 3 are each a unit for so-called group management of MFPs 100s. By group management, for example, a single timeout time is set in MFPs 100s belonging to the same subnetwork.

In communication system 10, within first subnetwork 1, MFP 100-11 sets a timeout time (a first timeout time) for communication within first subnetwork 1, and furthermore, sets a timeout time (a second timeout time) for communication between first subnetwork 1 and second subnetwork 2. MFP 100-11 notifies other MFPs within first subnetwork 1 of the first and second timeout times and notifies an MFP within second subnetwork 2 of the second timeout time. Hereinafter, a configuration of communication system 10 in FIG. 1 will more specifically be described.

In one or more embodiments of the present invention, communication system 10 is provided in a company having a plurality of business places. First subnetwork 1 is provided at a first business place of the company. Second subnetwork 2 is provided at a second business place of the company. Third subnetwork 3 is provided at a third business place of the company.

First subnetwork 1 includes n MFPs 100-11 to 100-1n and a router 201. n represents any integer. MFPs 100-11 to 100-1n communicate with each other within first subnetwork 1 and further communicate with a device within second subnetwork 2 and a device within third subnetwork 3 via router 201.

Second subnetwork 2 includes m MFPs 100-21 to 100-2m and a router 202. m represents any integer. MFPs 100-21 to 100-2m communicate with each other within second subnetwork 2 and further communicate with a device within first subnetwork 1 and a device within third subnetwork 3 via router 202.

Third subnetwork 3 includes p MFPs 100-31 to 100-3p and a router 203. p represents any integer. MFPs 100-31 to 100-3p communicate with each other within third subnetwork 3 and further communicate with a device within first subnetwork 1 and a device within second subnetwork 2 via router 203.

The number of subnetworks and the number of MFPs included in communication system 10 are not limited those shown in FIG. 1. Which MFP belongs to which one of first to third subnetworks 1 to 3 is identified by, for example, the IP address of each MFP 100.

In communication system 10, one MFP is designated as a "representative MFP" in each subnetwork. The "representative MFP" sets, for example, a timeout time for communication within the subnetwork to which the representative MFP belongs (i.e., a first timeout time). Furthermore, the "representative MFP" sets a timeout time for communication between the subnetwork to which the representative MFP belongs and another subnetwork (i.e., a second timeout time). The representative MFP notifies other MFPs within the same subnetwork of the first and second timeout times and notifies the other subnetworks of the second timeout time.

In the following description, MFP 100-11 is indicated as a representative MFP of first subnetwork 1 by way of example. MFP 100-21 is indicated as a representative MFP of second subnetwork 2 by way of example. MFP 100-31 is indicated as a representative MFP of third subnetwork 3 by way of example. The number of MFPs composing each subnetwork is not limited to that shown in FIG. 1. The subnetwork may include a single MFP. In the following description, when MFPs 100-11 to 100-1n, MFPs 100-21 to 100-21 to 100-2m, and MFPs 100-31 to 100-3p are referred to in referring to a common property thereof, they will collectively be referred to as "MFP 100."

[Configuration of MFP]

(External Appearance)

Figure 2:
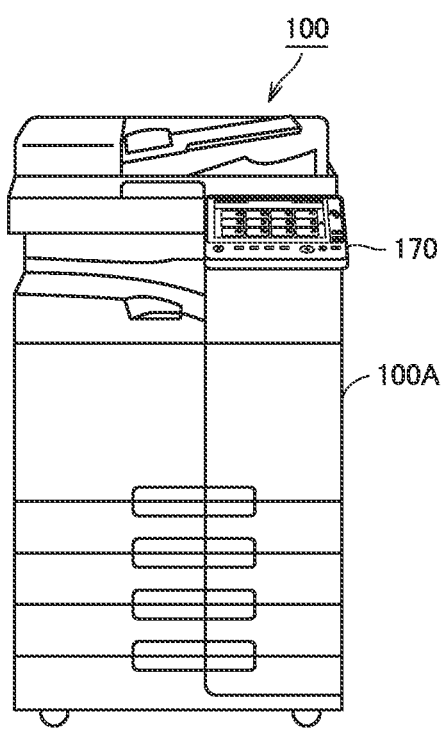
FIG. 2 shows an external appearance of an MFP (Multi-Functional Peripheral) according to one or more embodiments of the present invention.

FIG. 2 shows an external appearance of MFP 100. MFP 100 includes a main body 100A that houses a hardware portion that implements an image processing function, and a console panel 170 that is configured to receive information input by a user. Console panel 170 is an example of an input interface.

(Hardware Configuration)

Figure 3:
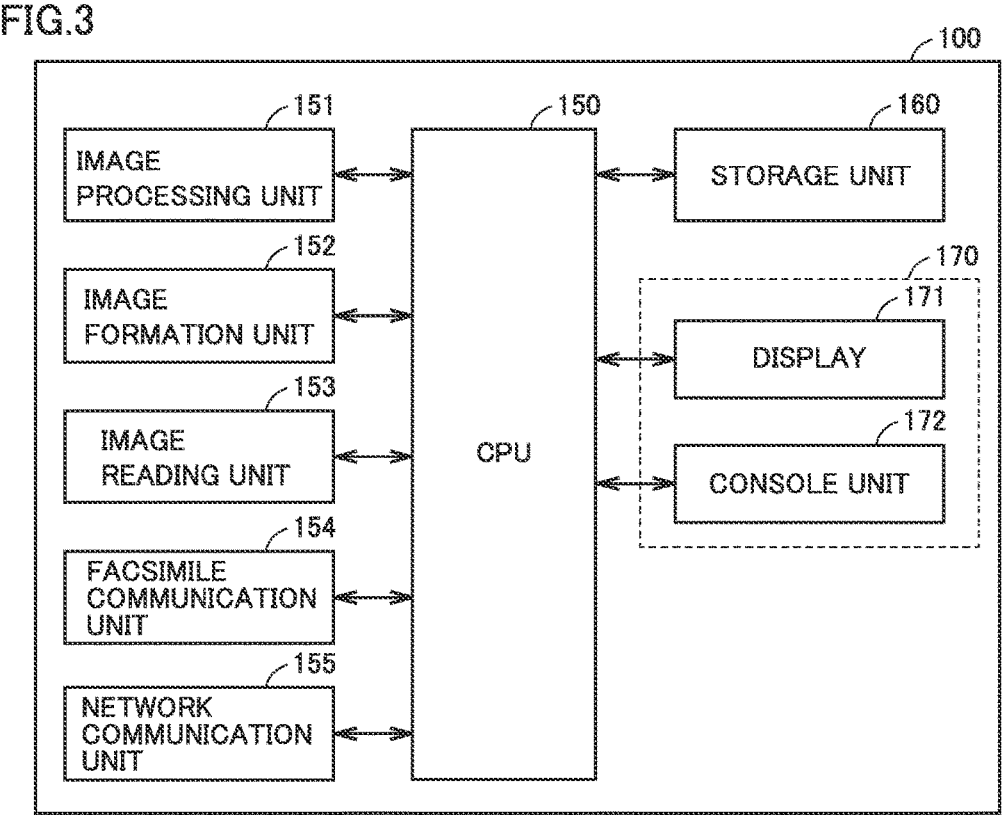
FIG. 3 schematically shows a hardware configuration of the MFP according to one or more embodiments of the present invention.

FIG. 3 schematically shows a hardware configuration of MFP 100. Referring to FIG. 3, MFP 100 includes a CPU (Central Processing Unit) 150 for general control, a storage unit 160 for storing a program and data, and console panel 170.

Storage unit 160 stores a program executed by CPU 150 and a variety of data. The data stored in storage unit 160 includes a timeout time table (see FIG. 6 described later).

Console panel 170 includes a display 171 and a console unit 172. An example of display 171 is a liquid crystal display device. Another example of display 171 is a plasma display. Console unit 172 is implemented for example by a hardware key and/or a plurality of software keys displayed on display 171. MFP 100 further includes an image processing unit 151, an image formation unit 152, an image reading unit 153, a facsimile communication unit 154, and a network communication unit 155.

Image processing unit 151 processes input image data to for example enlarge/reduce an output image. Image processing unit 151 is implemented by an image processing processor and memory for example.

Image formation unit 152 is implemented by hardware resources for forming an image on a recording sheet such as a photoreceptor, and hardware resources for transporting the recording sheet. Image reading unit 153 is implemented by hardware resources, such as a scanner, configured to generate image data of an original document. Facsimile communication unit 154 includes an element, such as a modem, for transmitting and receiving image data via facsimile communication. Network communication unit 155 is implemented by hardware resources, such as a network card, configured to transmit and receive data via a network. Network communication unit 155 is an example of a communication interface. Image processing unit 151, image formation unit 152, image reading unit 153, facsimile communication unit 154, and network communication unit 155 each have a function well known in an image formation apparatus, and accordingly, they will not be described redundantly in detail.

(Functional Configuration)

Figure 4:
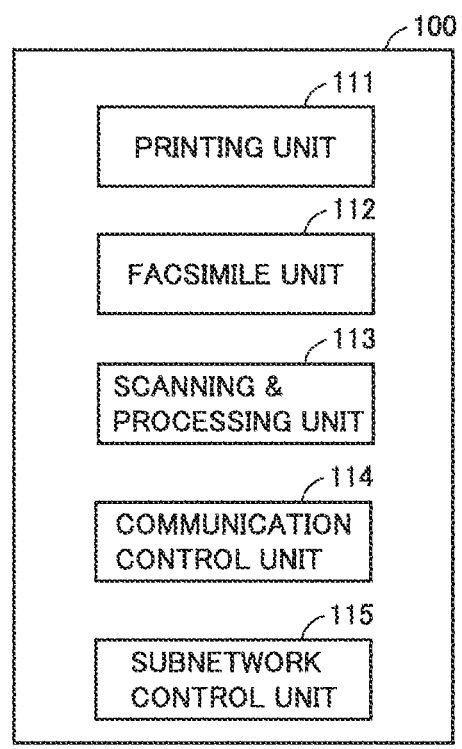
FIG. 4 shows an example of a functional block of the MFP according to one or more embodiments of the present invention.
Figure 5:
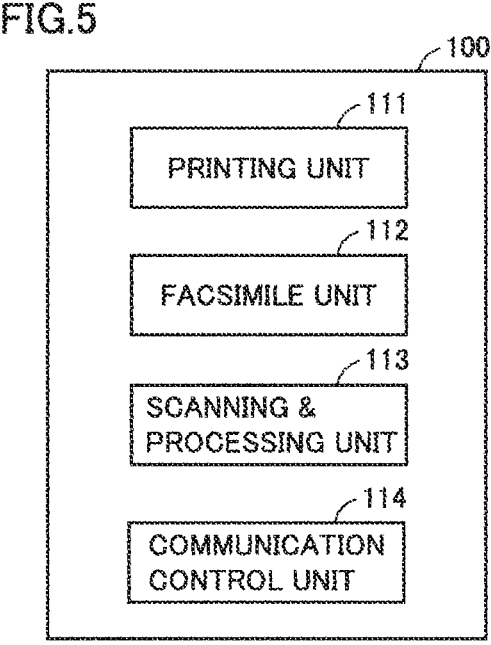
FIG. 5 shows another example of a functional block of the MFP according to one or more embodiments of the present invention.

FIGS. 4 and 5 show an example of a functional block of MFP 100. FIG. 4 shows a functional block of a representative MFP in a subnetwork. FIG. 5 shows a functional block of a representative MFP in a subnetwork.

As shown in FIG. 4, MFP 100 includes a printing unit 111 to form an image on a recording medium such as a recording sheet, a facsimile unit 112 to transmit and receive image data by facsimile communication, a scanning and processing unit 113 to read an original document to generate image data of the original document, a communication control unit 114 to control communication with another device, and a subnetwork control unit 115 to set a timeout time and make notification thereof. In the functional block shown in FIG. 5, MFP 100 includes printing unit 111, facsimile unit 112, scanning and processing unit 113, and communication control unit 114. As can be seen from comparison between FIG. 4 and FIG. 5, the representative MFP as compared with other MFPs further includes subnetwork control unit 115.

An example of a correspondence between the function(s) shown in FIG. 4 (and FIG. 5) and the hardware shown in FIG. 3 will be described. Printing unit 111 is implemented by image formation unit 152 controlled by CPU 150 for example. Facsimile unit 112 is implemented by facsimile communication unit 154 controlled by CPU 150 for example. Scanning and processing unit 113 is implemented by image reading unit 153 controlled by CPU 150 for example. Communication control unit 114 is implemented by CPU 150 and network communication unit 155. Subnetwork control unit 115 is implemented by CPU 150 and network communication unit 155. Note, however, that this correspondence is only an example. Each function can be implemented by any other hardware resources.

In one or more embodiments, each MFP 100 has an application previously installed therein to function as subnetwork control unit 115. For example, CPU 150 of MFP 100 designated as a "representative MFP" by a network administrator functions as subnetwork control unit 115 using the application.

[Set Contents of Timeout Time]

FIG. 6 shows an example of set contents of a timeout time (or a timeout time table) stored in storage unit 160 (see FIG. 3) of each MFP 100. Communication control unit 114 of each MFP 100 (see FIGS. 4 and 5) communicates with another device using such set contents of a timeout time as shown in FIG. 6. The example in FIG. 6 shows set contents for MFP 100 belonging to first subnetwork 1.

As shown in FIG. 6, set contents of a timeout time include an internal timeout time and an external timeout time. The internal timeout time is a timeout time set for communication within the subnetwork to which MFP 100 using the set contents shown in FIG. 6 belongs. The example in FIG. 6 shows set contents for MFP 100 within first subnetwork 1. Accordingly, the internal timeout time in FIG. 6 is a timeout time for communication within first subnetwork 1, and a specific example thereof is "20 seconds."

The external timeout time is a timeout time set by MFP 100 for communication with a device outside the subnetwork to which MFP 100 belongs. In the example of FIG. 6, the external timeout time includes a timeout time set for communication with a device within second subnetwork 2 ("device within second subnetwork": 120 seconds as one example) and a timeout time set for communication with a device within third subnetwork 3 ("device within third subnetwork": 150 seconds as one example).

[Setting Timeout Time within Communication System]

FIG. 7 schematically shows set contents of a timeout time within communication system 10. In FIG. 7, "From" represents a subnetwork which is a sender of data. "To" represents a subnetwork which is a recipient of data. FIG. 7 shows a timeout time each set for a combination of a sender and a recipient. For example, in FIG. 7, a timeout time applied when the "first subnetwork" is specified as "From" and the "second subnetwork" is specified as "To" represents a timeout time applied when data is transmitted from a device within first subnetwork 1 to a device within subnetwork 2. In FIG. 7, the timeout time (i.e., a threshold value 1-2) is 120 seconds.

In the example of FIG. 7, a timeout time does not change even when a sender and a recipient are switched. More specifically, a timeout time applied when the "second subnetwork" is specified as "From" and the "first subnetwork" is specified as "To" (i.e., a threshold value 2-1) is the same as the timeout time (threshold value 1-2), i.e., 120 seconds.

Further, in the example of FIG. 7, a timeout time applied when a sender and a recipient belong the same subnetwork is represented by a timeout time set for communication within a subnetwork. That is, a timeout time applied when first subnetwork 1 is specified as both "From" and "To" represents a timeout time for communication within first subnetwork 1. In FIG. 7, the timeout time (i.e., a threshold value 1-1) is 20 seconds.

The timeout time table shown in FIG. 6 and stored in each MFP 100 corresponds to a portion of a setting of the entirety of communication system 10 shown in FIG. 7. That is, the "internal timeout time" in FIG. 6 corresponds to the timeout time for communication within first subnetwork 1 in FIG. 7.

The "external timeout time (device within second subnetwork 2)" in FIG. 6 corresponds to a timeout time set for communication between a device within first subnetwork 1 and a device within second subnetwork 2 in FIG. 7.

Figure 8:
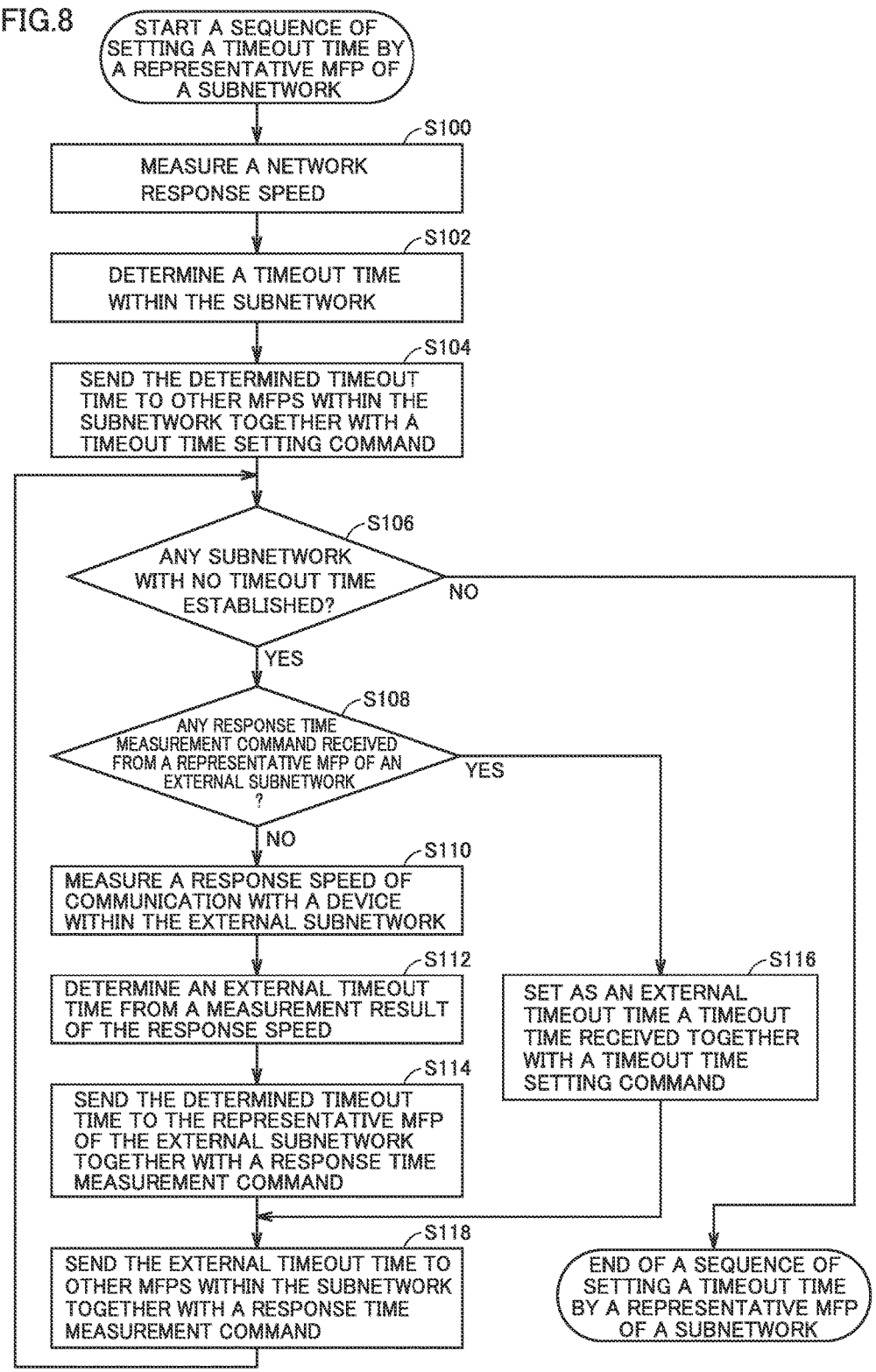
FIG. 8 is a flowchart of a process performed in a representative MFP according to one or more embodiments of the present invention.

In communication system 10, a timeout time is set for intra- and inter-subnetwork communications, as shown in FIG. 7. The timeout time is set for example by a representative MFP within a subnetwork. With reference to FIG. 8, a process for setting a timeout time will now be described.

[Setting Timeout Time]

FIG. 8 is a flowchart of an example of a process performed by CPU 150 of representative MFP 100. The FIG. 8 process is implemented for example by CPU 150 executing a computer program stored in storage unit 160 or the like. The process in FIG. 8 starts for example when a subnetwork including MFP 100 having that CPU 150 mounted therein is additionally constructed and added to communication system 10. Alternatively, the process in FIG. 8 starts for example when a subnetwork including MFP 100 having that CPU 150 mounted therein is additionally incorporated in communication system 10. Alternatively, the process in FIG. 8 starts for example when CPU 150 detects that another, additional subnetwork is incorporated into communication system 10.

In step S100, CPU 150 measures a network response speed within the subnetwork to which MFP 100 having that CPU 150 mounted therein belongs. The speed is measured for example by sending a network response speed measuring packet (hereinafter also simply referred to as a "response speed measuring packet," e.g., a Ping packet) to any one of MFPs 100s within the subnetwork and measuring a response time consumed in response to the sending of the packet. The shorter the response time, the faster the network response speed.

In step S102, CPU 150 determines a timeout time for communication within the subnetwork (i.e., the internal timeout time in FIG. 6) in accordance with a measurement result of a response speed in step S100. In one or more embodiments of the present invention, information defining a relationship between a response time and a timeout time is stored in storage unit 160, and CPU 150 use the information to determine a timeout time. In one or more embodiments of the present invention, a shorter timeout time is determined for a faster response speed.

In step S104, CPU 150 sends the timeout time that is determined in step S102, together with a timeout time setting command, to other MFPs 100s within the subnetwork to which MFP 100 having that CPU 150 mounted therein belongs. In response, CPU 150 of MFP 100 having received the command sets the received timeout time as the internal timeout time (see FIG. 6).

In step S106, CPU 150 determines whether there is any subnetwork with no timeout time established. In one or more embodiments of the present invention, in step S106, CPU 150 determines whether there is any subnetwork for which no value is registered in the timeout time table (see FIG. 6) as an external timeout time. If there is any subnetwork for which no value is registered as an external timeout time, CPU 150 determines that there is a subnetwork with no timeout time established.

FIG. 9 shows an exemplary state of a timeout time table. In the state shown in FIG. 9, the timeout time table has a value registered for an internal timeout time and does not have any value registered for an external timeout time. In such a case, CPU 150 determines that there is a subnetwork with no timeout time established. In contrast, in the state shown in FIG. 6, the timeout time table has an internal timeout time and all external timeout times registered. In such a case, CPU 150 determines that there is no subnetwork with no timeout time established. In step S106, if CPU 150 determines that there is any subnetwork with no timeout time established, CPU 150 proceeds to step S108 (YES in step S106), whereas if CPU 150 determines that there is no such subnetwork, CPU 150 ends the process in FIG. 8 (NO in step S106).

In step S108, CPU 150 determines whether a network response time measuring command (hereinafter also simply referred to as a "response time measuring command") has been received from a representative MFP of an external subnetwork. If CPU 150 determines that a response time measuring command has been received, CPU 150 proceeds to step S116 (YES in step S108), whereas if CPU 150 determines that a response time measuring command has not been received, CPU 150 proceeds to step S110 (NO in step S108).

In step S116, CPU 150 sets an external timeout time in the timeout time table in accordance with the received timeout time setting command.

FIG. 10 shows another exemplary state of a timeout time table. When the state shown in FIG. 10 is compared with the state shown in FIG. 9, a value is added for an external timeout time (for third subnetwork 3). When the timeout time table is in the state shown in FIG. 9, and CPU 150 receives a timeout time and a network response time measuring command (hereinafter also simply referred to as a "response time measuring command") from the representative MFP of third subnetwork 3, CPU 150 updates the timeout time table, as shown in FIG. 10. That is, CPU 150 of MFP 100 within first subnetwork 1 adds to the timeout time table a timeout time for communication between a device within first subnetwork 1 and a device within third subnetwork 3.

Returning to FIG. 8, in step S110, CPU 150 sends a response speed measuring packet to a representative MFP of a subnetwork with no timeout time established and measures a response time for the packet to measure a response speed of communication with that subnetwork.

In step S112, CPU 150 determines in accordance with the response speed (or response time) measured in step S110 a timeout time for communication with the subnetwork which is the recipient of the packet.

In step S114, CPU 150 sends the timeout time that is determined in step S112 to MFP 100 that is the recipient of the packet in step S110 together with a response time measurement command. As a result, MFP 100 having received the response time measurement command sets the timeout time therein and furthermore, sends the timeout time to other MFPs 100s within the subnetwork to which MFP 100 belongs.

In step S118, CPU 150 sends the timeout time determined in step S112 or the timeout time set in step S116, together with a response time measurement command, to other MFPs 100s within the subnetwork to which MFP 100 having that CPU 150 mounted therein belongs. Furthermore, CPU 150 registers the timeout time in the timeout time table of storage unit 160. Subsequently, CPU 150 returns to step S106.

Thus, in the process described with reference to FIG. 8, in order to set first and second timeout times, CPU 150 sends a response speed measuring packet to other MFPs within the subnetwork to which an MFP having that CPU 150 mounted therein belongs or a representative MFP of another subnetwork. Note that the method of setting a timeout time is not limited thereto. For example, when CPU 150 sends a packet for handshaking with another MFP 100, CPU 150 may set a timeout time in accordance with a response time consumed in response to the sending of the packet.

As a timing to start the process of FIG. 8, CPU 150 may re-set an internal timeout time and a timeout time depending on a communication speed on a network. That is, for example, CPU 150 may start the process of FIG. 8 when CPU 150 determines that a speed of communication within the subnetwork to which MFP 100 having that CPU 150 mounted therein belongs (i.e., a speed in response to sending of a packet) and a speed of communication with a device within an external subnetwork exceed a predetermined threshold value. In that case, even if an external timeout time has already been set in step S106, CPU 150 may proceed from step S106 to step S108 and update an external timeout time stored in storage unit 160.

CPU 150 may store in storage unit 160 a history of a speed of communication within the subnetwork to which MFP 100 having that CPU 150 mounted therein belongs and a speed of communication with a device within an external subnetwork, and use the history to set an internal timeout time and/or an external timeout time. In one or more embodiments of the present invention, CPU 150 derives an average value of a speed of communication with each device of an external network for each predetermined time zone, and, in accordance with each average value, sets an external timeout time for each time zone of each day. CPU 150 sends the set external timeout time to other MFPs 100s of the subnetwork to which MFP 100 having that CPU 150 mounted therein belongs, together with a timeout time setting command, and furthermore, sends the set external timeout time to a representative MFP of a corresponding external network together with a timeout time setting command.

FIG. 11 schematically shows a specific example of a history of a response time serving as an example of a communication speed. The information representing the history in FIG. 11 is stored in storage unit 160 of the representative MFP of first subnetwork 1, for example, and represents a history of a response time in response from a device within second subnetwork 2. As shown in FIG. 11, the history stored in storage unit 160 represents a response time for every two hours of each day in milliseconds. FIG. 12 schematically shows a specific example of a correspondence between response time and timeout time. The information representing the correspondence indicated in FIG. 12 is stored in storage unit 160 of the representative MFP of first subnetwork 1, for example, and associates response time with timeout time. Note that FIGS. 11 and 12 indicate numerical values by way of example.

In one or more embodiments of the present invention, in step S112 of FIG. 8, CPU 150 uses the history of FIGS. 11 and 12 to determine an external timeout time for communication with a device within second subnetwork 2. More specifically, when CPU 150 determines an external timeout time for a time zone, CPU 150 calculates an average value of a response time of that time zone in the history of FIG. 11 and subsequently selects a timeout time corresponding to that average value in the correspondence of FIG. 12 to determine an external timeout time. The selected timeout time is the determined external timeout time. According to the example of FIG. 12, for example, for a response time having an average value of 130 milliseconds, an external timeout time that is determined is 120 seconds.

When CPU 150 determines an external timeout time for a time zone, CPU 150 may extract only data of a time zone common to the time zone for which the external timeout time is determined, and use the data to calculate an average value. One example of being "corresponding" is being the same day of the week. Another example is that days are common in that they are weekdays or holidays. For example, when setting a timeout time for a time zone of 10:00-11:59 on Wednesday, CPU 150 extracts, of the history, only a response time in that time zone on Wednesday or extracts, of the history, only a response time in that time zone of weekdays (i.e., from Monday to Friday), and calculates an average value of such extracted response times.

Storage unit 160 may store information representing a history and a correspondence regarding internal timeout time in a manner similar to that shown in FIGS. 11 and 12, and CPU 150 may use the information to calculate an internal timeout time.

[Exemplary Variation of Setting Timeout Time (1)]

Figure 13:
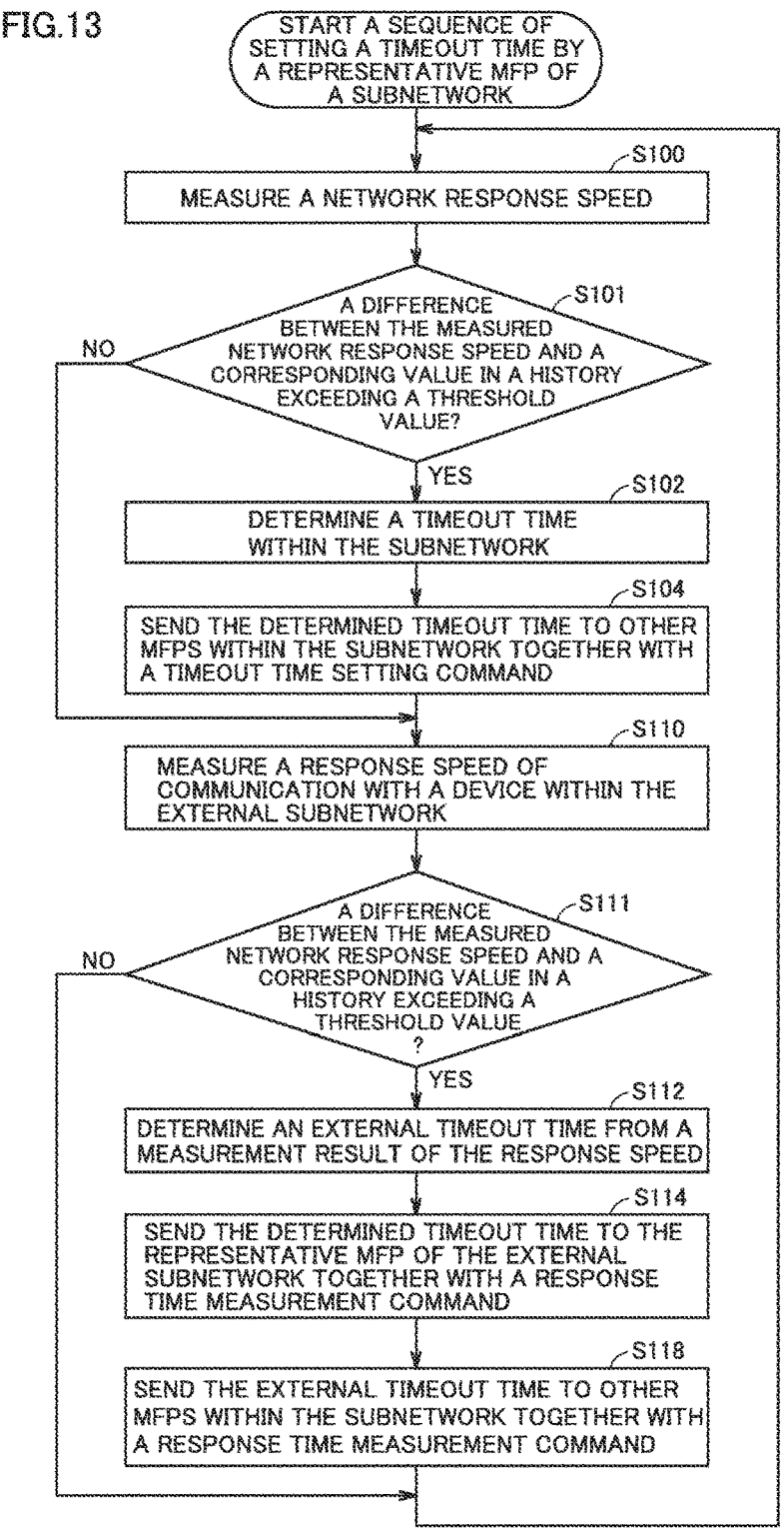
FIG. 13 is a flowchart of another example of a process performed in a representative MFP according to one or more embodiments of the present invention.

CPU 150 may periodically measure an internal network response time and/or a response time regarding each external network, and if a difference between a measured response time and a corresponding value in a history or a difference between the measured response time and an average value calculated from the history exceeds a value, CPU 150 may set a timeout time. In that case, the process of FIG. 8 is changed as shown in FIG. 13, for example. FIG. 13 is a flowchart of another example of a process performed in a representative MFP. Hereinafter, the process shown in FIG. 13 will be described by focusing on a difference from the process shown in FIG. 8.

When compared with the process shown in FIG. 8, the process shown in FIG. 13 further includes step S101 and step S111.

In step S100, CPU 150 measures a network response speed within the subnetwork to which MFP 100 having that CPU 150 mounted therein belongs, and CPU 150 then proceeds to step S101. In step S101, CPU 150 determines whether a difference between the measured response speed (or response time) and a corresponding value in an internal network time history exceeds a predetermined threshold value. An example of the corresponding value in the history is a response speed (or response time) belonging to the same day of the week and same time zone as a time at which the response speed (or response time) is measured in step S101, or an average value thereof. When CPU 150 determines that the difference exceeds the threshold value (YES in step S101), CPU 150 proceeds to step S102. When CPU 150 determines that the difference is equal to or less than the threshold value (NO in step S101), CPU 150 proceeds to step S110.

In step S102, CPU 150 determines an internal timeout time in accordance with a response speed measured in step S100, and in step S104, CPU 150 sends the internal timeout time to MFP 100 inside the subnetwork together with a timeout time setting command, and proceeds to step S110.

In step S110, CPU 150 measures a response speed (or response time) of communication with an external subnetwork.

In step S111, CPU 150 determines whether a difference between a response speed (or response time) measured in step S110 and a corresponding value in an external network time history exceeds a predetermined threshold value. An example of the corresponding value in the history is a response speed (or response time) belonging to the same day of the week and same time zone as a time at which measurement is done regarding the same external network as that for which a response speed (or response time) is measured in step S111, or an average value thereof. When CPU 150 determines that the difference exceeds the threshold value (YES in step S111), CPU 150 proceeds to step S112. When CPU 150 determines that the difference is equal to or less than the threshold value (NO in step S111), CPU 150 returns to step S100.

In step S112, CPU 150 determines an external timeout time in accordance with a response speed measured in step S110, and in step S114, CPU 150 sends the external timeout time to a representative MFP 100 of an external subnetwork together with a response time setting command, and in step S118, CPU 150 sends the external timeout time to other MFPs 100s belonging to the same subnetwork as MFP 100 having that CPU 150 mounted therein, together with a response time setting command, and returns to step S100.

[Exemplary Variation of Setting Timeout Time (2)]

Figure 14:
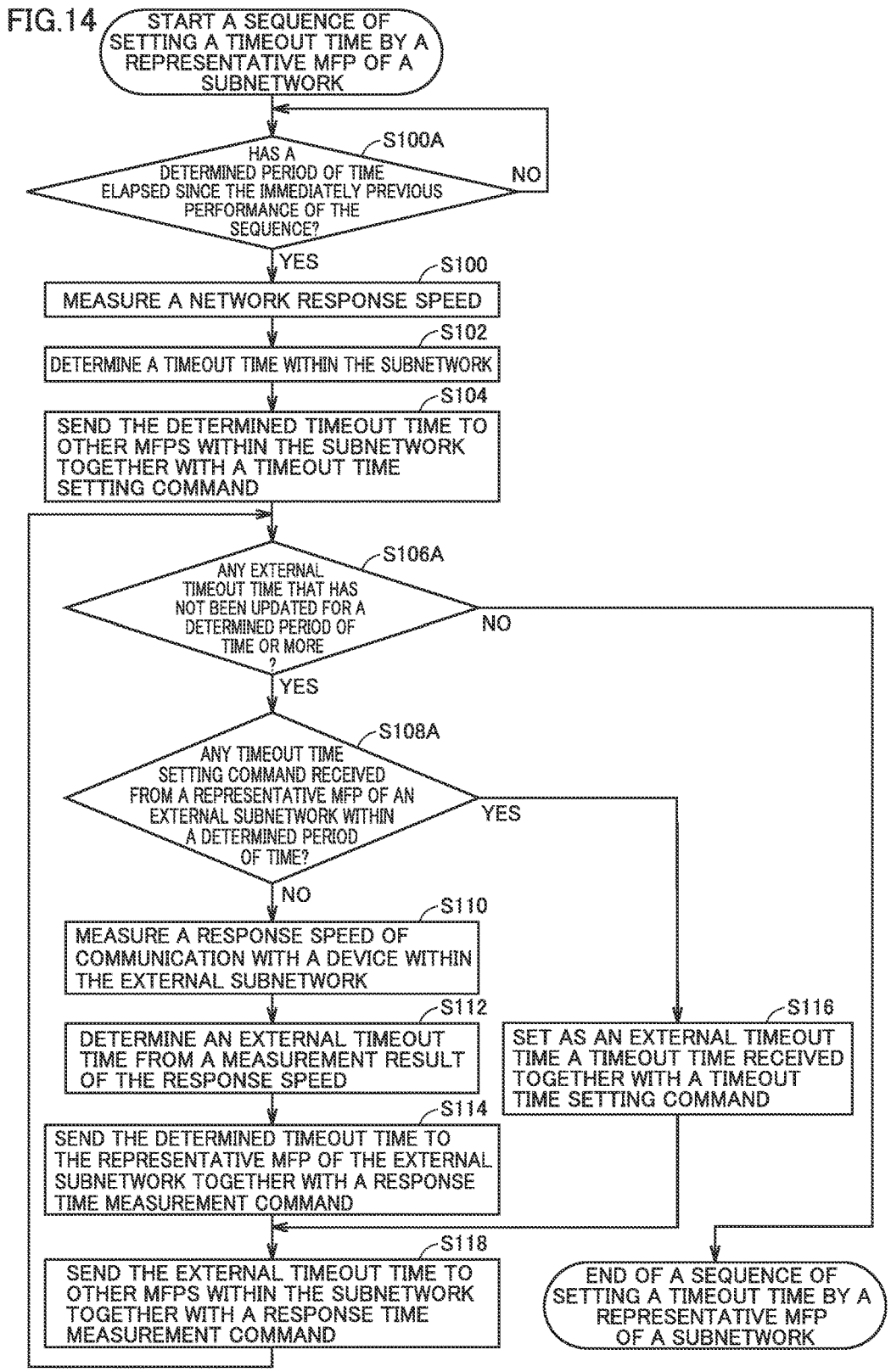
FIG. 14 is a flowchart of still another example of a process performed in a representative MFP according to one or more embodiments of the present invention.

FIG. 14 is a flowchart of still another example of a process performed to set a timeout time. As shown in FIG. 14, representative MFP 100 may set a timeout time whenever a fixed period of time (for example of one hour) elapses. The process shown in FIG. 14, as compared with the process shown in FIG. 8, further comprises step S100A, and furthermore, comprises steps S106A and 108A instead of steps S106 and S108. Hereinafter, the process shown in FIG. 14 will be described by focusing on a difference from the process shown in FIG. 8.

In step S100A, CPU 150 determines whether a determined period of time has elapsed since the process of FIG. 14 was immediately previously performed, and until CPU 150 determines that the determined period of time has elapsed CPU 150 stays at step S100A (NO in step S100A), and once CPU 150 determines that the determined period of time has elapsed, CPU 150 proceeds to step S100 (YES in step S100A).

In step S100, CPU 150 measures a response speed within a subnetwork, and in step S102, CPU 150 determines an timeout time in accordance with a response speed measured in step S100, and in step S104, CPU 150 sends the determined timeout time to MFP 100 within the subnetwork together with a timeout time setting command, and proceeds to step S106A.

In step S106A, CPU 150 determines whether there is any external timeout time that has not been updated for a determined period of time or more. If CPU 150 determines that there is no such external timeout time (NO in step S106A), CPU 150 terminates the process of FIG. 14. In contrast, if CPU 150 determines that there is such an external timeout time (YES in step S106A), CPU 150 proceeds to step S108A.

In step S108A, for an external timeout time determined in step S106A by CPU 150 as not having been updated for the determined period of time or more, CPU 150 determines whether a timeout time setting command has been received from a representative MFP of a subnetwork corresponding to that external timeout time since a point in time preceding the current point in time by a determined period of time. In one or more embodiments of the present invention, CPU 150 of first subnetwork 1 performs the process of FIG. 14. When CPU 150 determines in step S106A that a timeout time for second subnetwork 2 has not been updated for the determined period of time or more, CPU 150 determines in step S108A whether a timeout time setting command has been received from the representative MFP of second subnetwork 2. If CPU 150 determines that a timeout time setting command has been received (YES in step S108A), CPU 150 proceeds to step S116, whereas if CPU 150 determines that the command has not been received (NO in step S108A), CPU 150 proceeds to step S110.

In steps S110 to S118, CPU 150 exerts control in the same way as described with reference to FIG. 8.

[Exemplary Variation of Setting Timeout Time (3)]

Figure 15:
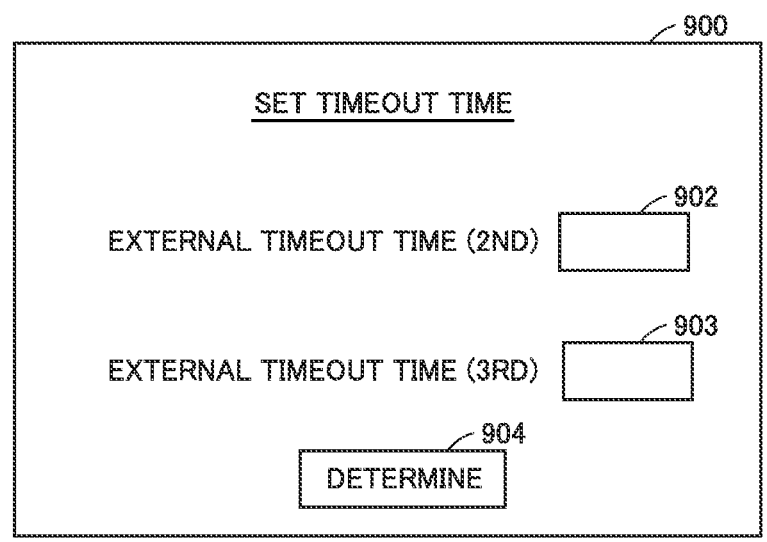
FIG. 15 shows a screen displayed on an MFP according to one or more embodiments of the present invention.

CPU 150 can also set a value input by a user as an internal timeout time and/or an external timeout time. FIG. 15 shows an example of a screen for setting a timeout time.

FIG. 15 shows a screen 900 for accepting an input of an external timeout time. Screen 900 includes an input field 902 for inputting an external timeout time for second subnetwork 2, an input field 903 for inputting an external timeout time for third subnetwork 3, and a determination button 904 for determining values entered in input fields 902 and 903, respectively. By accepting an operation done to console unit 172, for example, CPU 150 receives values entered to input fields 902 and 903 and accepts an operation done to determination button 904.

In one or more embodiments of the present invention, CPU 150 does not determine an external timeout time in step S112 (see FIG. 8) and instead displays screen 900 of FIG. 15 on display 171 (see FIG. 3) for example. CPU 150 determines the value(s) entered in input field 902 and/or input field 903 as an external timeout time.

In one or more embodiments of the present invention, CPU 150 in step S112 determines an external timeout time and subsequently, displays in input field 902 an external timeout time determined in step S112 for second subnetwork 2 and displays in input field 903 an external timeout time determined in step S112 for third subnetwork 3, and receives a change done by a user to the values displayed in input fields 902 and 903. The user does not change or changes the values displayed in input fields 902 and 903 and thereafter operates determination button 904. In response, CPU 150 determines the value input (or displayed) in input field 902 as a timeout time for second subnetwork 2, and determines the value input (or displayed) in input field 903 as a timeout time for third subnetwork 3.

In step S114 CPU 150 sends the determined external timeout times to representative MFPs of external subnetworks, and in step S118 CPU 150 sends the determined external timeout times to other MFPs 100s within the subnetwork to which MFP 100 having that CPU 150 mounted therein belongs.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A communication system comprising:
    a first subnetwork comprising a first image processing apparatus; and
    a second subnetwork comprising a second image processing apparatus, wherein
    the first image processing apparatus comprises:
        a processor; and
        a communication interface that communicates with another device, and
    the processor:
        sets a first timeout time serving as a timeout time for communication within the first subnetwork and a second timeout time serving as a timeout time for communication between the first subnetwork and the second subnetwork;
        via the communication interface, notifies an image processing apparatus within the first subnetwork other than the first image processing apparatus of the first timeout time and the second timeout time; and via the communication interface, notifies the second image processing apparatus of the second timeout time.

2. The communication system according to claim 1, further comprising:
a third subnetwork comprising a third image processing apparatus, wherein
when the processor receives from the third image processing apparatus a third timeout time serving as a timeout time for communication between the first subnetwork and the third subnetwork, the processor notifies the image processing apparatus within the first subnetwork other than the first image processing apparatus of the third timeout time.

3. The communication system according to claim 1, wherein the processor sets the first timeout time and the second timeout time whenever a predetermined period of time elapses, and make notification of the first timeout time and the second timeout time.

4. The communication system according to claim 1, wherein the processor sets the first timeout time in accordance with a response time of a device within the first subnetwork; and
the processor sets the second timeout time in accordance with a response time of a device within the second subnetwork.

5. The communication system according to claim 1, wherein the processor sets the first and second timeout times in accordance with a history of information representing communication loads of the first and second subnetworks, respectively.

6. The communication system according to claim 1, wherein
the first image processing apparatus further comprises:
an input interface that receives information input, and
the processor sets the first timeout time and the second timeout time in response to specific information input to the input interface.

7. The communication system according to claim 1, wherein the processor sets the first timeout time and the second timeout time in response to the first subnetwork being added to the communication system.

8. An image processing apparatus in a first subnetwork of a communications system comprising the first subnetwork and a second subnetwork, the image processing apparatus comprising:
a processor; and
a communication interface that communicates with another device, wherein
the processor:
sets a first timeout time serving as a timeout time for communication within the first subnetwork and a second timeout time serving as a timeout time for communication between the first subnetwork and the second subnetwork;
via the communication interface, notifies an image processing apparatus within the first subnetwork other than the image processing apparatus having the processor of the first timeout time and the second timeout time; and
via the communication interface, notifies an image processing apparatus in the second subnetwork of the second timeout time.

9. The image processing apparatus according to claim 8, wherein
the communication system further comprises:
a third subnetwork, and
when the processor receives from an image processing apparatus in the third subnetwork a third timeout time serving as a timeout time for communication between the first subnetwork and the third subnetwork, the processor notifies an image processing apparatus within the first subnetwork other than the image processing apparatus having the processor of the third timeout time.

10. The image processing apparatus according to claim 8, wherein the processor sets the first timeout time and the second timeout time whenever a predetermined period of time elapses, and make notification of the first timeout time and the second timeout time.

11. The image processing apparatus according to claim 8, wherein the processor sets the first timeout time in accordance with a response time of a device within the first subnetwork; and
the processor sets the second timeout time in accordance with a response time of a device within the second subnetwork.

12. The image processing apparatus according to claim 8 wherein the processor sets the first and second timeout times in accordance with a history of information representing communication loads of the first and second subnetworks, respectively.

13. The image processing apparatus according to claim 8, further comprising:
an input interface to receive information input, wherein
the processor sets the first timeout time and the second timeout time in response to specific information input to the input interface.

14. The image processing apparatus according to claim 8, wherein the processor sets the first timeout time and the second timeout time in response to the first subnetwork being added to the communication system.

15. A non-transitory computer-readable storage medium storing a computer program executed by at least one processor of an image processing apparatus in a first subnetwork of a communication system comprising the first subnetwork and a second subnetwork, the computer program causing the processor to:
set a first timeout time serving as a timeout time for communication within the first subnetwork and a second timeout time serving as a timeout time for communication between the first subnetwork and the second subnetwork;
notify an image processing apparatus within the first subnetwork other than the image processing apparatus having the processor of the first timeout time and the second timeout time; and
notify an image processing apparatus in the second subnetwork of the second timeout time.

16. The storage medium according to claim 15, wherein
the communication system further comprises:
a third subnetwork, and
when the processor receives from an image processing apparatus in the third subnetwork a third timeout time serving as a timeout time for communication between the first subnetwork and the third subnetwork, the computer program causes the processor to notify an image processing apparatus within the first subnetwork other than the image processing apparatus having the processor of the third timeout time.

17. The storage medium according to claim 15, wherein the computer program causes the processor to set the first timeout time and the second timeout time whenever a predetermined period of time elapses, and making notification of the first timeout time and the second timeout time.

18. The storage medium according to claim 15, wherein the computer program further causes the processor to:
set the first timeout time in accordance with a response time of a device within the first subnetwork; and
set the second timeout time in accordance with a response time of a device within the second subnetwork.

19. The storage medium according to claim 15, wherein the computer program further causes the processor to set the first and second timeout times in accordance with a history of information representing communication loads of the first and second subnetworks, respectively.

20. The storage medium according to claim 15, wherein the computer program further causes the processor to set the first timeout time and the second timeout time in response to specific information input to the image processing apparatus having the processor.

21. The storage medium according to claim 15, wherein the computer program further causes the processor to set the first timeout time and the second timeout time in response to the first subnetwork being added to the communication system.

* * * * *